United States Patent Office 3,034,834
Patented May 15, 1962

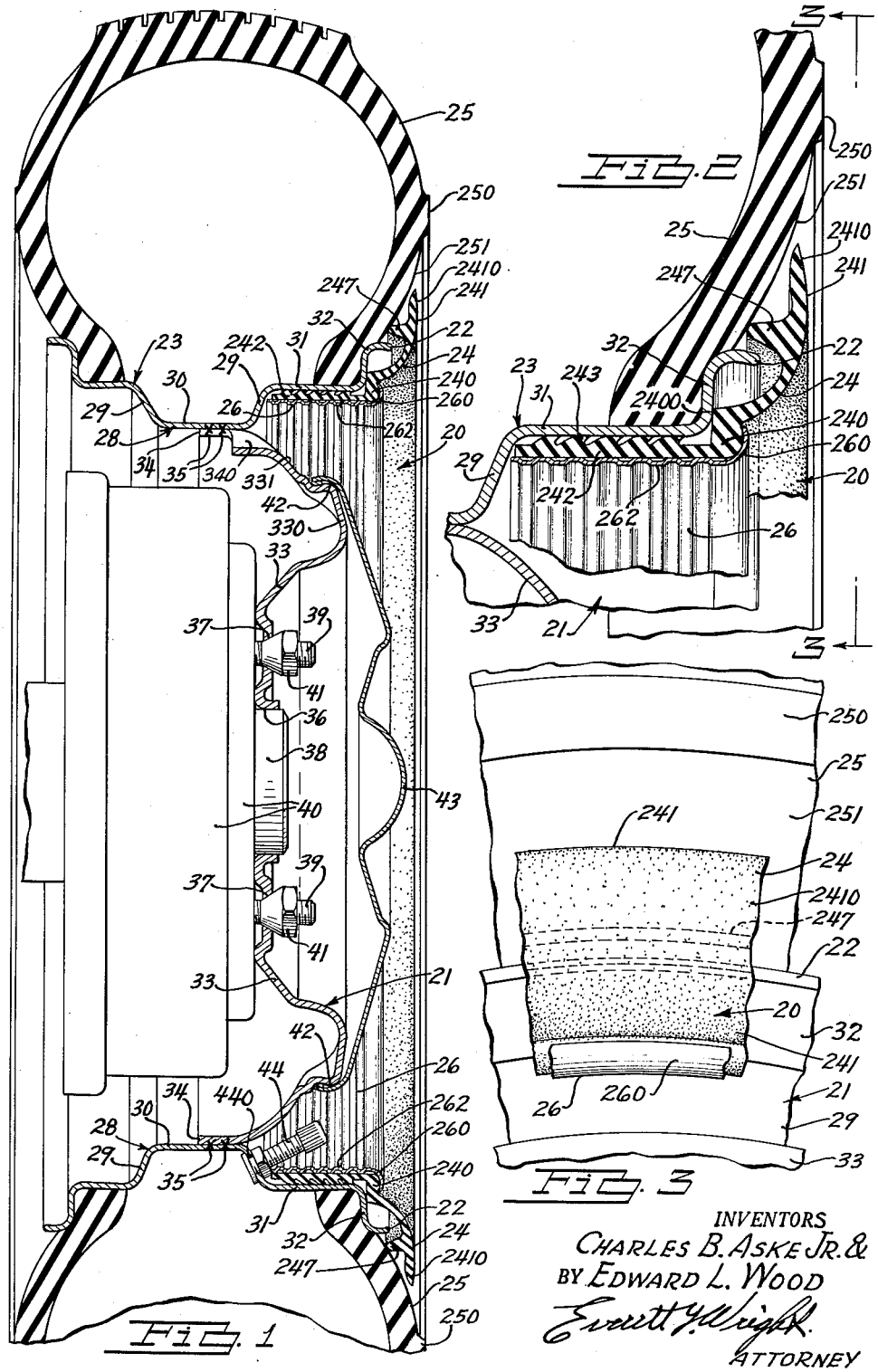

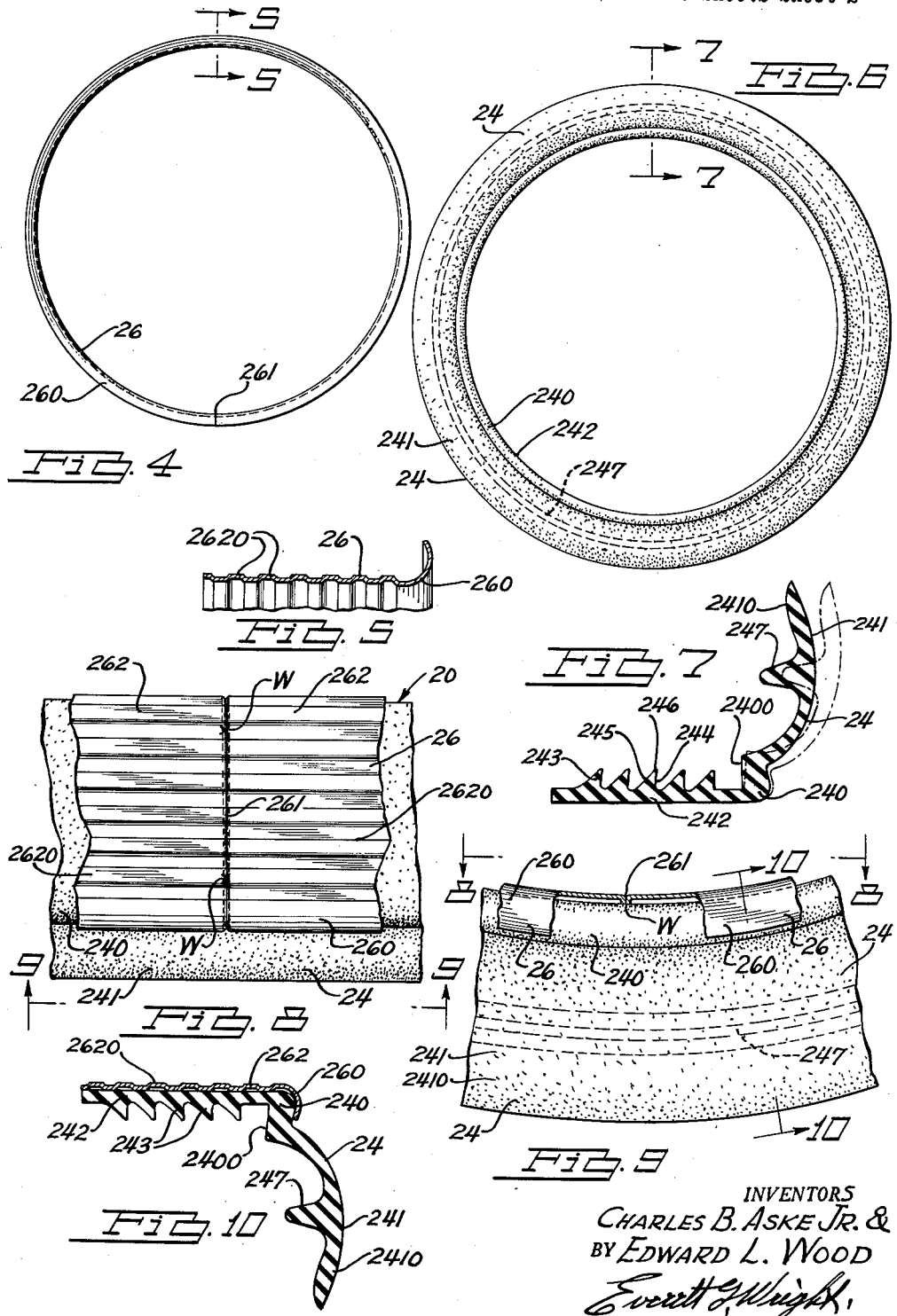
May 15, 1962     C. B. ASKE, JR., ETAL     3,034,834
VEHICLE WHEEL TRIM
Filed Feb. 6, 1959     3 Sheets-Sheet 2
INVENTORS
CHARLES B. ASKE JR. &
BY EDWARD L. WOOD
Everett G. Wright,
ATTORNEY May 15, 1962 C. B. ASKE, JR., ETAL 3,034,834
VEHICLE WHEEL TRIM
Filed Feb. 6, 1959 3 Sheets-Sheet 3
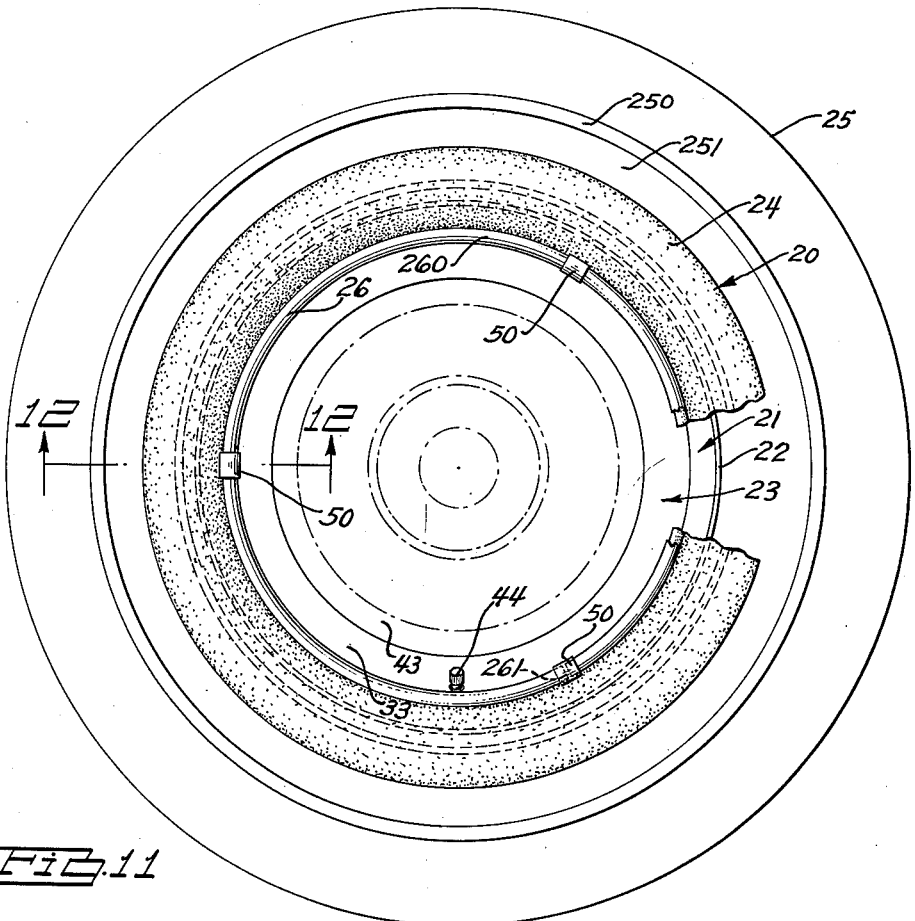
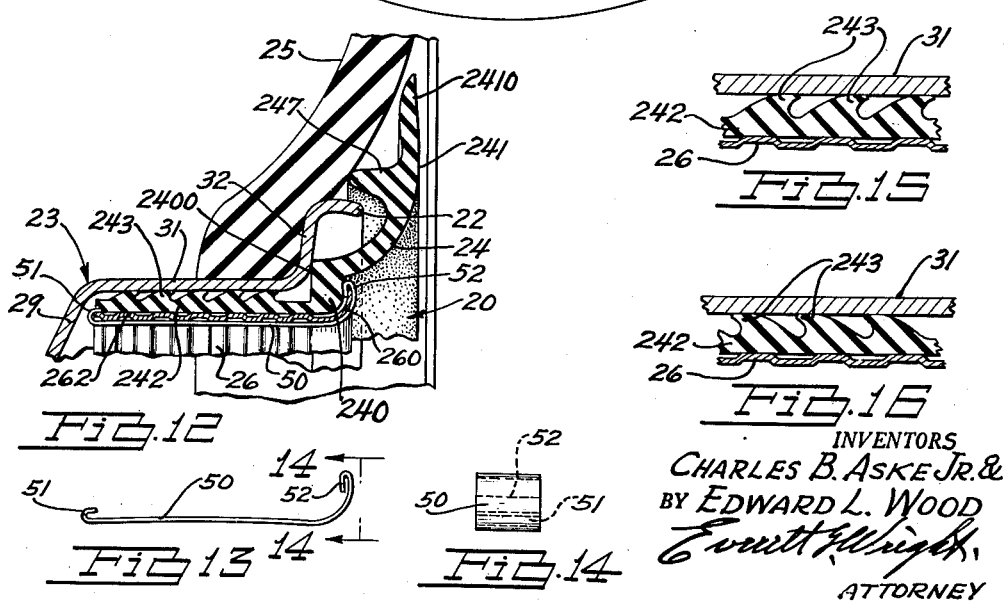
INVENTORS
CHARLES B. ASKE JR. &
BY EDWARD L. WOOD
Everett E. Wright,
ATTORNEY

3,034,834
VEHICLE WHEEL TRIM
Charles B. Aske, Jr., 1278 Pilgrim Road, Birmingham, Mich., and Edward L. Wood, 4684 Audubon, Detroit, Mich.
Filed Feb. 6, 1959, Ser. No. 791,571
4 Claims. (Cl. 301—37)

This invention relates to vehicle wheel trim, and in particular to improved, effective and simplified means for trimming a vehicle wheel and the tire thereon to provide an extremely desirable long lasting over-all aesthetic effect at a minimum of cost.

This invention is a continuation-in-part of an application for Letters Patent of the United States of Charles B. Aske, Jr. and Edward L. Wood, Serial No. 719,573, filed March 6, 1958, now Patent No. 2,963,325, entitled, "Wheel Trim."

In the prior art various means have been employed to trim vehicle wheels such as hub caps, hub caps with a trim at the outer side flange of the wheel rim, and wheel covers. Wheel covers are not only relatively cumbersome but their use generally depreciates the normal wheel effect and gives an impression of a more or less hubless disc type wheel. Furthermore, wheel covers generally do not extend over the lip of the wheel rim, particularly when secured to the vehicle wheel by such means as a toothed or fingered metal band carried by the wheel cover. Wheel covers are expensive to manufacture, and, because of their weight, they are considered difficult to retain on vehicle wheels when various conventional forms of anchorage means are employed to removably secure them in place. The use of hub caps and wheel trim covering the outer side flange of the wheel rim of vehicle wheels produces a somewhat desirable over-all wheel trim effect which, although having considerable aesthetic appeal, does not completely meet the demand for a substitute for or an improvement over wheel covers.

The use of white side wall tires in conjunction with conventional wheel trim is considered desirable, however the employment of both white side wall tires and conventional wheel trim to improve the appearance of vehicle wheels is not only uneconomical but is undesirable because of the generally recognized short life of white side wall tires. Furthermore, the use of white side wall tires does not overcome the undesirable and aesthetically poor relatively flat wheel effect obtained by the use of conventional wheel covers.

In our co-pending application, Serial No. 719,573, the invention was directed to providing a novel rim trim construction including improved, inexpensive and simplified means for positively securing the said rim trim to a vehicle wheel rim, and also to provide rim trim for vehicle wheels incorporating as an element thereof tire trim means for providing a white or colored side wall tire effect, the said combined rim trim and white or colored side wall tire trim consisting of simple and inexpensive to manufacture assembly of elements that may be readily and easily applied to vehicle wheels.

In the combined rim trim and side wall tire trim of the type referred to above, the rim trim is secured to the axially disposed tire bead seat of a vehicle wheel by means of a resilient annularly toothed anchor element from which a white or other colored tire trim ring extends radially outwardly over the lip of the wheel rim and has its outer periphery flexed into contact with the tire wall axially and radially inwardly of the scuff bead of the vehicle tire.

With the foregoing construction, if rubber were used as a combined rim trim backing and tire trim element, then, as the tire flexes, the pressure of the outer peripheral portion of the tire trim element on the tire wall would wear an annular groove in the tire wall, and, at the same time the heat of friction between the thin outer periphery of the tire trim and the tire wall would cause undesirable discoloration of the tire trim ring, particularly when a white rubber is employed to produce a white side wall tire effect. If certain rubber substitutes or synthetic rubber such as butyl are employed in the manufacture of the tire trim, the tire trim would become noisy due to friction between the thin outer periphery of the synthetic rubber substitute and the tire wall. Also, the synthetic rubber would not flex back to its original form and location as completely and readily as live rubber after distortion or buckling of the tire trim due to accidental curbing of the tire of a vehicle wheel equipped with the novel wheel trim-tire trim of the said co-pending application S.N. 719,573. Furthermore, in some instances, the friction between the outer peripheral portion of the tire trim and the tire side wall creates more heat than could be dissipated by the pumping action of the tire and tire trim when the vehicle is being driven which changes the air normally entrapped in the annular space between the tire trim and the tire wall. Such excessive heat would increase the discoloration of the tire trim element, particularly in hot weather driving.

With the foregoing in view, the primary object of the instant invention is to provide an improved vehicle wheel trim or tire trim-rim trim assembly for vehicle wheels consisting of an annular ornamental white or other colored tire trim element of molded rubber or the like and an annular metal rim trim element of stainless steel or the like, the said tire trim element including a radially disposed annular tire trim portion and a preferably integral axially disposed anchorage portion having a plurality of axially spaced resilient annular teeth therearound, the said annular rim trim element being radially disposed within the said anchorage portion of the tire trim element and functions, in addition to its rim trim function, to maintain the anchorage portion of the said tire trim element firmly in its annular form and to the proper annular size to permit the said tire trim-wheel trim assembly to be removably mounted on a vehicle wheel with the said toothed anchorage portion firmly telescoped and engaged within the tire bead seat annulus of the vehicle wheel rim.

A further object of the invention is to provide a wheel trim in the form of a tire trim-rim trim assembly of the foregoing type wherein the annular tire trim portion of the tire trim element includes an annular axially and rearwardly extending gage flange adapted to contact the tire of the vehicle wheel adjacent the lip of the wheel rim whereby to hold the outer periphery of the said tire trim portion of the tire trim element spaced from the said tire at all times, and to prevent an accumulation of dirt therebehind.

Another object of the invention is to provide a tire trim-rim trim assembly of the aforementioned type wherein the inner periphery of the tire trim portion of the tire trim element is provided with an axially facing stop seat which contacts the axial outer periphery of the tire bead seat flange of the wheel rim upon which the said tire trim-rim trim is mounted whereby to properly locate the said tire trim-rim trim assembly on a vehicle wheel when being mounted on the rim thereof.

A further object of the invention is to provide a tire trim-rim trim assembly of the type described wherein the rim trim element is formed with a bull-nose overlying the radial inner periphery of the tire trim portion of the tire trim element to maintain the said tire trim element and said rim trim element in proper assembled relationship during the mounting thereof on the rim of a vehicle wheel.

And still another object of the invention is to provide a tire trim-rim trim assembly of the type described wherein the annular teeth around the anchorage portion of the tire trim element are formed to flex readily in an axially outer trailing attitude when said tire trim-rim trim assembly is mounted on a wheel by telescoping the said anchorage portion of the said tire trim element and the rim trim element in their assembled relationship axially within the tire bead seat annulus of the vehicle wheel rim, the said resilient annular teeth being flexible into a reverse or axially inner trailing attitude during the axial removal of said trie trim-rim trim assembly from said wheel.

Other objects of the invention will become apparent by reference to the following detailed description taken in connection with the accompanying drawings, in which:

FIG. 1 is a vertical sectional view through a vehicle wheel and tire equipped with rim trim-tire trim embodying the invention showing its relationship with respect to a typical modern vehicle wheel having a hub cap and tire thereon.

FIG. 2 is an enlarged fragmentary detailed sectional view of the rim trim-tire trim disclosed in FIG. 1.

FIG. 3 is an enlarged fragmentary elevational view taken on the line 3—3 of FIG. 2.

FIG. 4 is a side elevational view of the rim trim element preferably employed.

FIG. 5 is an enlarged cross sectional view taken on the line 5—5 of FIG. 4.

FIG. 6 is a side elevational view of the tire trim element preferably employed.

FIG. 7 is an enlarged cross sectional view taken on the line 7—7 of FIG. 6.

FIG. 8 is an enlarged fragmentary elevational view taken on the line 8—8 of FIG. 9 showing the improved rim trim and tire trim elements in their assembled relationship prior to installation on a vehicle wheel, the joint in the rim trim element being shown.

FIG. 9 is a fragmentary elevational view of the rim trim and tire trim elements taken on the line 9—9 of FIG. 8, a portion of the bull-nose of the rim trim element being broken away to show the preferably welded joint therein.

FIG. 10 is a cross sectional view taken on the line 10—10 of FIG. 9.

FIG. 11 is a side elevational view of a vehicle wheel having a tire thereon equipped with wheel trim consisting of a rim trim and tire trim assembly embodying the invention, auxiliary ornamental clips being shown at spaced intervals around the rim trim element, one of which preferably covers the joint in the rim trim element.

FIG. 12 is an enlarged cross sectional view taken on the line 12—12 of FIG. 11 showing an auxiliary ornamental clip in place on the rim trim element of the rim trim-tire trim assembly.

FIG. 13 is a side elevational view of the particular auxiliary ornamental clip shown in FIG. 12.

FIG. 14 is an elevational view taken on the line 14—14 of FIG. 13.

FIG. 15 is a greatly enlarged fragmentary sectional view of the rim trim-tire trim assembly of FIGS. 1 and 10 when pressed axially into anchored relationship within the axially disposed tire bead seat annulus of a vehicle wheel rim and disposed firmly thereagainst showing the attitude assumed by the circumferential teeth of the anchorage portion of the tire trim elements when the rim trim-tire trim assembly is being positioned on or is disposed in anchored relationship on the vehicle wheel.

FIG. 16 is a greatly enlarged fragmentary sectional view similar to FIG. 15 showing the attitude assumed by the circumferential teeth of the anchorage portion of the tire trim element when the rim trim-tire trim assembly is being removed from the vehicle wheel.

Referring now to the drawings wherein like reference numerals refer to like and corresponding parts throughout the several views, the embodiment of the invention disclosed in FIGS. 1–16 inclusive consists of improved and highly effective vehicle wheel trim construction or tire trim-wheel trim assembly 20 which is disclosed in connection with a typical modern vehicle wheel 21 having a tubeless tire 25 mounted thereon.

The said vehicle wheel 21 has a drop center rim 23 composed of a central channel or drop center 28 having side walls 29 and a base 30. An annular tire bead seat 31 extends laterally outwardly from each side of the side walls 29 of the drop center 28, each said tire bead seat 31 terminating in a tire bead seat flange 32 extending upwardly therefrom which is curved at its upper portion to form an axially disposed outer lip 22. The said tire bead seat flange 32 is ofttimes referred to as the wheel flange and the said lip 22 is ofttimes referred to as the lip of the wheel rim. Within the drop center rim 23 is a wheel spider 33 having an axially disposed flange 34 which is secured to the central channel 28 of the drop center rim 23 by such means as welding at 35. The said wheel spider 33 is provided with a central hub aperture 36 with securing stud holes 37 spaced therearound to accommodate respectively the wheel hub 38 and wheel securing studs 39 extending from the brake drum 40 to which the wheel 21 is secured by means of the usual wheel securing nuts 41.

The flange 34 of the spider 33 is generally scalloped out and formed at 340 at intervals around the periphery thereof to provide brake drum ventilation and added structural strength to the vehicle wheel 21. The spider 33 is generally formed with an annular axially outwardly extending collar 330 which is preferably provided with a plurality of hub cap retainer nubs 42 over which a conventional hub cap 43 is sprung for securement onto the vehicle wheel 21. The said spider collar 330 generally has an annular exposed painted surface 331 extending from the outer periphery of the hub cap 43 to the drop center wheel rim 23, which also has its exposed surfaces painted. The particular tire 25 illustrated in the drawings is a modern tubeless tire having a scuff bead 250 extending from its wall 251. The said tubeless tire 25, when used on the vehicle wheel 21, requires a valve stem 44 to be mounted in sealed relationship through a valve stem aperture 440 provided in the outer wall 29 of the drop center rim channel 28 of the rim 23 of the said wheel 21.

The particular vehicle wheel trim 20 disclosed in FIGS. 1–16 inclusive comprises two elements, a tire trim element 24 of molded live rubber or other suitable resilient material and a rim trim element 26 of stainless steel or other relatively rigid material, which elements cooperate, not only to enhance and beautify the appearance of the vehicle wheel 21 and its tire 25, but also to removably secure the said wheel trim 20 onto the vehicle wheel 21 and over a portion of the tire 25 mounted thereon. The said tire trim element 24 and the rim trim element 26 are preferably assembled into a wheel trim or tire trim-wheel trim assembly 20 prior to mounting on a vehicle wheel 21.

The tire trim element 24 of the wheel trim 20 shown separately in FIGS. 6 and 7 preferably consists of an annular bead portion 240, an annular curved white or colored side wall portion 241 extending radially outwardly from said bead portion 240, and an annular anchorage flange or sleeve portion 242 extending axially inwardly from said bead portion 240, the said annular anchorage flange portion 242 including a plurality of circumferential axially spaced teeth 243 disposed radially outwardly therefrom. The said side wall portion 241 of the tire trim element 24 also includes an annular axially rearwardly disposed gage flange 247 of sufficient depth to contact the wall 251 of the tire 25 to hold and maintain the outer periphery 2410 of the side wall portion 241 of the tire trim element 24 spaced from the said tire wall 251 at all times. The said gage flange 247 is preferably located to become positioned in radially spaced relationship to the lip 22 of the wheel rim 23 when the tire trim-wheel trim assembly 20 is mounted on a vehicle wheel 21. The axially inner face of the bead portion 240 of the said tire trim element 24 serves as a stop seat 2400 to properly locate the wheel trim assembly 20 on a vehicle wheel when mounted thereon as hereinafter described.

The rim trim element 26 of the wheel trim 20 shown separately in FIGS. 4 and 5 preferably consists of an outer annular bead or bull-nose portion 260 and an annular ornamental sleeve portion 262 extending axially inwardly from said bull-nose portion 260. The said bullnose portion 260 of the rim trim element 26 conforms with and is juxtaposed to the bead portion 240 of the tire trim element 24 when the annular anchorage flange portion 242 of the tire trim element 24 is telescoped over the annular sleeve portion 262 of the rim trim element 26. FIGS. 8, 9 and 10 show the assembled relationship of the tire rim element 24 and the rim trim element 26. The ornamentation of the sleeve portion 262 of the rim trim element 26 is shown as circumferential ribs 2620 throughout the drawings and particularly in FIG. 5, which ribs have been found to be a preferable ornamentation; however, it is obvious that other ornamentation of the rim trim element 26 may be employed to provide other desirable reflective patterns which will pick up and reflect the color of the exposed painted surface 331 of the wheel spider 33.

The rim trim element 26 is preferably formed by a rolling operation, and is provided with suitable butt joint 261 which may be spot welded at W. It is obvious that any suitable lap or interlocked joint may be substituted for the joint 261 indicated in the drawings.

Each of the circumferential radially outwardly disposed teeth 243 of the annular flange portion 242 of the tire trim element 24 is preferably formed substantially triangular in cross section with a generally radially disposed axially outwardly facing wall 244 and an axially inwardly sloping wall 245. The said radially disposed axially outwardly facing circumferential teeth 243 of the tire trim element 24 shown in detail in FIG. 7 are suitably spaced so as to permit the apex 246 thereof to flex axially outwardly and radially inwardly when the wheel trim assembly 20 is mounted axially onto a vehicle wheel 21 as hereinafter described. The apex 246 of each of the said circumferential teeth 243 is preferably slightly truncated as shown in FIG. 7 so as to permit the said circumferential teeth 243 to roll over from their locked position against the bottom of the tire bead seat 31 of the rim 23 of the vehicle wheel 21 shown in FIG. 15 to their unlocked position shown in FIG. 16 to free the gripping of the said tire bead seat 31 by the said circumferential teeth 243 when the said wheel trim assembly 20 is forcibly removed axially from a vehicle wheel 21 as hereinafter described.

The tire trim element 24 and the rim trim element 26 of the wheel trim 20 are of such a diameter in respect to each other that the anchorage flange portion 242 of the tire trim element 24 may be telescoped or otherwise firmly anchored in assembled relationship onto the sleeve portion 262 of the rim trim element 26, see FIG. 10. This, in effect, properly sizes the tire trim element 24 and maintains it in its correct annular form and size. When the tire trim element 24 and the wheel trim element 26 of the wheel trim 20 are so assembled, the diameter of the apex 246 of the radially disposed axially outwardly facing circumferential teeth 243 is somewhat greater than the internal diameter of the annular tire bead seat 31 of the rim 23 of the vehicle wheel 21.

The wheel trim assembly 20 is mounted on the vehicle wheel 21 by forcibly telescoping the said wheel trim assembly axially within the inner annulus of the tire bead seat 31 thereof. This deforms the circumferential teeth 243 of the anchorage flange portion 242 of the tire trim element 24 from their normal attitude shown in FIG. 7 to their gripping position shown in FIG. 15. The said tire trim assembly 20 is pressed or otherwise forced axially onto the vehicle wheel 21 until the inner axially facing stop seat 2400 of the bead portion 240 of the tire trim element 24 is located in abutment with the flange 32 of the tire bead seat 31 of the said vehicle wheel 21. The wheel trim assembly 20 is now thoroughly and firmly anchored onto the rim 23 of the vehicle wheel 21, and the curved white or colored side wall portion 241 of the tire trim element 24 overlies the lip 22 of the wheel rim 23 of the vehicle wheel 21. The outer peripheral portion 2410 of the tire trim element 24 is held by the annular rearwardly disposed gage flange 247 thereof in spaced relationship with respect to the wall 251 of the tire 25 within the scuff bead 250 thereof, all as clearly illustrated throughout the drawings.

To remove the wheel trim assembly 20 from the vehicle wheel 21, the said tire trim assembly 20 is manually pried or pulled axially outwardly therefrom. This preferably is accomplished by removing the hub cap 43, using a tire iron or a large screw driver as a lever, and employing the collar 330 of the vehicle wheel 21 as a fulcrum, and prying the said wheel trim assembly axially outwardly from the axial inner periphery thereof. Initially, a relatively large force is required to start the removal of the wheel trim assembly 20 from the vehicle wheel 21 because the circumferential teeth 243 of the tire trim element 24 first must be flexed or rolled over from their locked position shown in FIG. 15 to their unlocked position shown in FIG. 16 whereupon the complete removal of the wheel trim assembly 20 from the vehicle wheel 21 becomes relatively easier.

The joint 261 of the rim trim element 26 may be disposed at any suitable location around the said rim trim element 26. In some installations, it may be necessary to notch out the axial inner portion of the rim trim element 26 and the axial inner portion of the annular anchorage flange portion 242 of the tire trim element opposite the valve stem 44. The said joint 261 may be placed opposite the tire stem notch if employed, or, as shown in FIG. 11, it may be placed at any location around the periphery of the rim trim element 26. In which event, the said joint 261 may be covered with an auxiliary ornamental clip 50 disposed across the face of the rim trim element 26. The said ornamental clip 50 may be a band of metal or the like as shown in FIGS. 12, 13 and 14 which is hooked at its axially inner and outer ends 51 and 52 respectively to engage the axial inner edge of the rim trim element 26 and the axial outer bull-nose 260 thereof respectively as best shown in FIG. 12. A plurality of ornamental clips 50 may be employed, for example, three ornamental clips 50 may be spaced at equal intervals around the rim trim element 26 as shown in FIG. 11, one covering the said joint 261 therein.

The vehicle wheel trim or tire trim-rim trim 20 of the invention does not cover the vent apertures of the vehicle wheel, which is of increasing importance in modern high speed vehicles having smaller wheels than heretofore wherein brake drum areas cannot be further increased to dissipate the heat generated by increased braking requirements. The tire valve stem is always exposed whereby to prevent flexing of the wheel trim-tire trim or its removal from the vehicle wheel to supply air to the tire.

Bleed through of carbon black from the tire wall to the outer periphery of the tire trim element is eliminated by tire trim-wheel trim embodying the invention. No dirt can accumulate behind the tire trim or rim rim elements of the tire trim-rim trim assembly, thus eliminating an age old problem of the accumulation of dirt and foreign matter behind conventional wheel trim such as wheel covers and the like.

A positive anchorage means is provided which is preferably fromed as an integral part of the tire trim element of the tire trim-rim trim assembly, which anchorage means accommodates the tire trim-rim trim assembly to wheels of a nominal size but varying slightly in dimensions as normally occurs when wheels of a nominal size are manufactured by different manufacturers. And further, vehicle wheel trim consisting of tire trim-rim trim constructed according to the invention is not only easily and readily mounted on vehicle wheels, but is thoroughly anchored thereon, requiring a definite removal procedure which eliminates quick removal thereof from vehicle wheels by thieves and pranksters.

The vehicle wheel trim 20 comprising a novel tire trim-rim trim assembly hereinbefore described is gaged to the wheel rim and to the tire to assure perfect location on the vehicle wheel and over the tire, thereby assuring that the outer peripheral portion of the tire trim element, generally white, will not be discolored by a bleed-through of carbon black from the side wall of the black tire normally used on vehicle wheels. By making the tire trim element of the tire trim-rim trim assembly 20 white, and the rim trim of stainless steel or other reflective material, a complete, highly desirable and inexpensive wheel and tire trim is provided costing in most instances less than one-half the cost of conventional wheel covers and white side wall tires replaced thereby.

Wheel trim embodying the invention may be mounted on new cars in an automobile sales room for display purposes, and removed therefrom without damage to the paint coating on the painted vehicle rim. This eliminates the usual automobile dealer costs of repainting wheel rims when a customer expresses a preference for a car without wheel trim, which repainting is usually occasioned by the removal from show room car wheels of conventional wheel covers having spring teeth which bite into the paint coating on vehicle wheels equipped therewith.

The novel anchorage means of the vehicle wheel trim 20 of the instant invention is more positive and permanent than conventional resilient metal teeth that bite into the painted surface of vehicle wheels, thereby eliminating the not too infrequent loss of wheel covers and the like employing such conventional anchorage means when vehicles equipped therewith are driven over rough roads, railroad crossings, and the like.

And furthermore, vehicle wheel trim in the form of a combined tire trim-rim trim embodying the invention not only enhances the appearance of a vehicle wheel normally ornamented with expensive wheel covers but gives the wheel a desirable depth to provide annular reflections and shadows. Tire trim-rim trim embodying the invention also provides an extremely desirable wheel trim for the presently conventional smaller diameter wheel coupled with a tire trim which eliminates the expense and necessity for the use of conventional white side wall tires.

The resilient anchorage means employed effectively seals the area of contact with the tire bead seat annulus of the wheel rim within the extreme axially inner and outer continuous annular teeth of the said anchorage means preventing water or dirt from working its way within the contact or toothed area thereby making the resilient anchorage more effective than otherwise. The gage flange of the tire trim element not only maintains the outer periphery of the tire trim portion thereof spaced from the tire wall, but it is formed to provide and seal an annular space or cavity around the lip of the wheel rim to accommodate wheel balance weights, if used. This seal is resiliently maintained at all times, and prevents the accumulation of dirt behind the side wall portion of the tire trim element of the wheel trim.

Although but a single embodiment of the invention has been disclosed and described herein, it is obvious that many changes may be made in the size, shape, arrangement, and detail of the various elements of the invention without departing from the spirit and scope thereof as defined by the appended claims.

We claim:

1. In a wheel structure for vehicle wheels including a wheel rim having tire bead seats and a tire mounted thereon, the outer tire bead seat forming an axially disposed annulus, a wheel trim consisting of a tire trim element including a resilient annular radially disposed tire trim portion and an integral resilient axially disposed anchorage flange portion substantially axially coextensive of said tire bead seat annulus, a plurality of integral axially spaced circumferentially continuous teeth formed around said anchorage flange portion, said tire trim portion being formed to flex against the axial outer wall of said tire and having an annular gage rib disposed adjacent the wheel rim and radially outwardly thereof holding the same spaced from said tire wall, and an annular rim trim element telescopingly assembled within said annular anchorage flange portion of said tire trim element sizing the said assembly whereby to permit it to be telescopingly mounted within the said outer axially disposed tire bead seat annulus of said wheel rim with the circumferential teeth of said resilient anchorage flange thereof flexed outwardly in firm but removable engagement with the said tire bead seat annulus.

2. In combination with a vehicle wheel including a rim having an annular axially extending tire bead seat and a tire mounted thereon, the outer tire bead seat forming an axially disposed annulus, a wheel trim consisting of a resilient annular tire trim element including a radially disposed tire trim portion formed to flex against the outer wall of said tire and a resilient integral circumferentially toothed axially disposed anchorage flange portion extending inwardly from the inner periphery of said tire trim portion, the said anchorage flange portion being substantially axially coextensive of said tire bead seat annulus, and an annular rim trim element assembled in telescoped relationship within said annular anchorage flange portion of said tire trim element sizing the said assembly whereby to permit it to be readily mounted on said wheel rim with the said annular resilient circumferential teeth of the anchorage flange thereof firmly telescopingly engaged within the said outer tire bead seat annulus of said wheel rim, annular stop means at the juncture of the tire trim portion and the anchorage flange portions of said tire trim element contacting the axial outer portion of the said outer tire bead seat of said wheel rim locating said wheel trim axially on said wheel rim when mounted thereon, and an annular gage rib formed axially inwardly of said tire trim portion of said tire trim element constantly contacting said tire wall radially outwardly adjacent said wheel rim holding the outer peripheral portion of said tire trim element spaced from the said tire wall.

3. In combination with a vehicle wheel including a rim having axially disposed annular tire bead seats and a tire mounted on said rim, the outer tire bead seat forming an axially disposed annulus, a wheel trim comprising a resilient annular tire trim element and a relatively rigid annular rim trim element, said tire trim element including an annular bead portion, an annular tire trim portion extending radially outwardly from said annular bead portion and an anchorage flange portion extending axially inwardly from said bead portion, said anchorage flange portion including a plurality of circumferentially continuous radially outwardly disposed resilient integral teeth formed to flex more readily axially outwardly than inwardly of said tire bead seat annulus, said rim trim element comprising an annular bead portion overlying said tire trim bead portion and a sleeve portion extending axially inwardly from said bead portion, the anchorage flange portion of said tire trim element being telescoped firmly over the said rim trim sleeve portion forming a unitary vehicle wheel trim assembly, the said wheel trim assembly being mounted on said vehicle wheel by forcibly telescoping the anchorage flange and rim trim portions thereof simultaneously within the said outer tire bead seat annulus of said vehicle wheel with the anchorage teeth of the anchorage flange portion flexed axially outwardly and compressed against the said outer tire bead seat annulus of said vehicle wheel rim, and an annular axially and rearwardly disposed gage rib formed on the annular tire trim portion of said tire trim element located to contact said tire wall adjacent said wheel rim and constantly hold the outer periphery of the tire trim portion of the tire trim element in spaced relationship with respect to said tire wall.

4. In a wheel structure for vehicle wheels including a wheel rim and a tire mounted thereon, a wheel trim and a resilient annular tire trim element including means mounting the same on said vehicle wheel, said annular tire trim element extending from said wheel trim radially outwardly over the outer wall of said tire and formed to flex thereagainst, and integral gage flange means extending axially rearwardly from said tire trim element spaced inwardly from the outer periphery thereof and contacting the wall of said tire immediately adjacent to and radially outwardly of said wheel rim holding the outer periphery of said tire trim element spaced from said tire wall whereby undesirable discoloration of the tire trim ring is prevented.

References Cited in the file of this patent
UNITED STATES PATENTS

| | | |
|---|---|---|
| 1,968,076 | Goodyear et al. | July 31, 1934 |
| 1,969,088 | Maranville | Aug. 7, 1934 |
| 1,985,378 | Lyon | Dec. 25, 1934 |
| 2,124,789 | Lyon | July 25, 1938 |
| 2,696,409 | Barnes | Dec. 7, 1954 |
| 2,736,610 | Waite | Feb. 28, 1956 |
| 2,903,300 | Hurd | Sept. 8, 1959 |

FOREIGN PATENTS

| | | |
|---|---|---|
| 1,061,278 | France | Nov. 25, 1953 |